(12) United States Patent
Spletzer

(10) Patent No.: US 6,247,372 B1
(45) Date of Patent: *Jun. 19, 2001

(54) LOAD CELL

(75) Inventor: Barry L. Spletzer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,410

(22) Filed: Oct. 1, 1999

(51) Int. Cl.[7] .................................................. G01L 7/22
(52) U.S. Cl. ........................................................ 73/862.044
(58) Field of Search ...................... 73/862.041, 862.042, 73/862.044, 761, 775, 841

(56) References Cited

U.S. PATENT DOCUMENTS

| | | |
|---|---|---|
| 4,138,884 | 2/1979 | Ruoff, Jr. et al. ...................... 73/133 |
| 4,493,220 | 1/1985 | Carnigan et al. . |
| 4,640,138 | 2/1987 | Meyer et al. ...................... 73/862.04 |
| 4,733,571 * | 3/1988 | Ormond ............................. 73/862.65 |
| 5,315,882 | 5/1994 | Meyer et al. .................... 73/862.044 |
| 5,339,697 | 8/1994 | Mullin ............................. 73/862.043 |
| 5,850,044 | 12/1998 | Spletzer .......................... 73/862.041 |
| 5,889,214 * | 3/1999 | Kang et al. ...................... 73/862.044 |
| 5,969,268 * | 10/1999 | Sommerfield et al. ......... 73/862.045 |

* cited by examiner

*Primary Examiner*—Benjamin R. Fuller
*Assistant Examiner*—Octavia Davis
(74) *Attorney, Agent, or Firm*—V. Gerald Grafe

(57) ABSTRACT

A load cell combines the outputs of a plurality of strain gauges to measure components of an applied load. Combination of strain gauge outputs allows measurement of any of six load components without requiring complex machining or mechanical linkages to isolate load components. An example six axis load cell produces six independent analog outputs which can be combined to determine any one of the six general load components.

15 Claims, 2 Drawing Sheets

LOAD CELL

This invention was made with Government support under Contract DE-AC04-94AL85000 awarded by the U.S. Department of Energy. The Government has certain rights in the invention.

BACKGROUND OF THE INVENTION

This invention relates to the field of load cells, specifically load cells that measure torsion or shear.

Load cells are used for measuring forces and moments along certain directions. Measurement of loads and moments about multiple axes can be beneficial in various research and manufacturing applications. Current multi-axis load cells, however, require complex machining and mechanical linkages to isolate loads along multiple axes. Loads that manifest only through shear stress at the load cell typically require especially complex machining or linkages for isolation. See, e.g., Meyer et al., U.S. Pat. No. 4,640,138; Meyer et al., U.S. Pat. No. 5,315,882; Mullin, U.S. Pat. No. 5,339,697; Rieck et al., U.S. Pat. No. 4,259,863; Ruoff, Jr. et al., U.S. Pat. No. 4,138,884. Current multi-axis load cells are consequently expensive to manufacture, and can be readily damaged by overloading. The frequency response of current load cells is also limited by the characteristics of the machining and mechanical linkages, precluding their use in applications with rapidly varying loads.

Many applications that might benefit from multi-axis load measurements are precluded by the high cost of current multi-axis load cells. Also, applications such as many robotics applications encounter widely varying loads. Some encounter unknown loading, making load cell damage due to overloading likely. Also, existing load cells can not be integrated into a robot link, complicating the robotic system.

There is a need for a multi-axis load cell that is simple and inexpensive to manufacture, that is unlikely to be damaged by widely varying loads, and that can be readily incorporated into a robotic system.

SUMMARY OF THE INVENTION

The present invention provides an improved load cell that is simple and inexpensive to manufacture, and that is capable of measuring a wide range of loads. The present invention uses strain gauges, mounted in novel arrangements on free surfaces of a load cell body, to measure loads.

Generally, six load components are of interest: axial load, axial moment (torsion), two loads at angles to the axis (typically along two axes mutually orthogonal and orthogonal to the cell axis), and moments about two axes at angles to the cell's axis (typically about two axes mutually orthogonal and orthogonal to the cell axis). Strain gauges measure axial surface strain along a given axis, and accordingly do not directly measure any of the six loads of interest. Placing sets of strain gauges at certain locations on free surfaces of the cell, however, can allow the gauge outputs to be combined to measure any of the six load components of interest individually. Specific placements of the strain gauges, described herein, can provide coupled, linearly-independent relationships among strain gauge outputs and load components. Individual load components can be determined from the strain gauge outputs and the coupled linearly-independent relationships.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides an improved load cell that is simple and inexpensive to manufacture, and that is capable of measuring a wide range of loads. The present invention uses strain gauges, mounted in novel arrangements on free surfaces of a load cell body, to measure loads.

Figure 1:
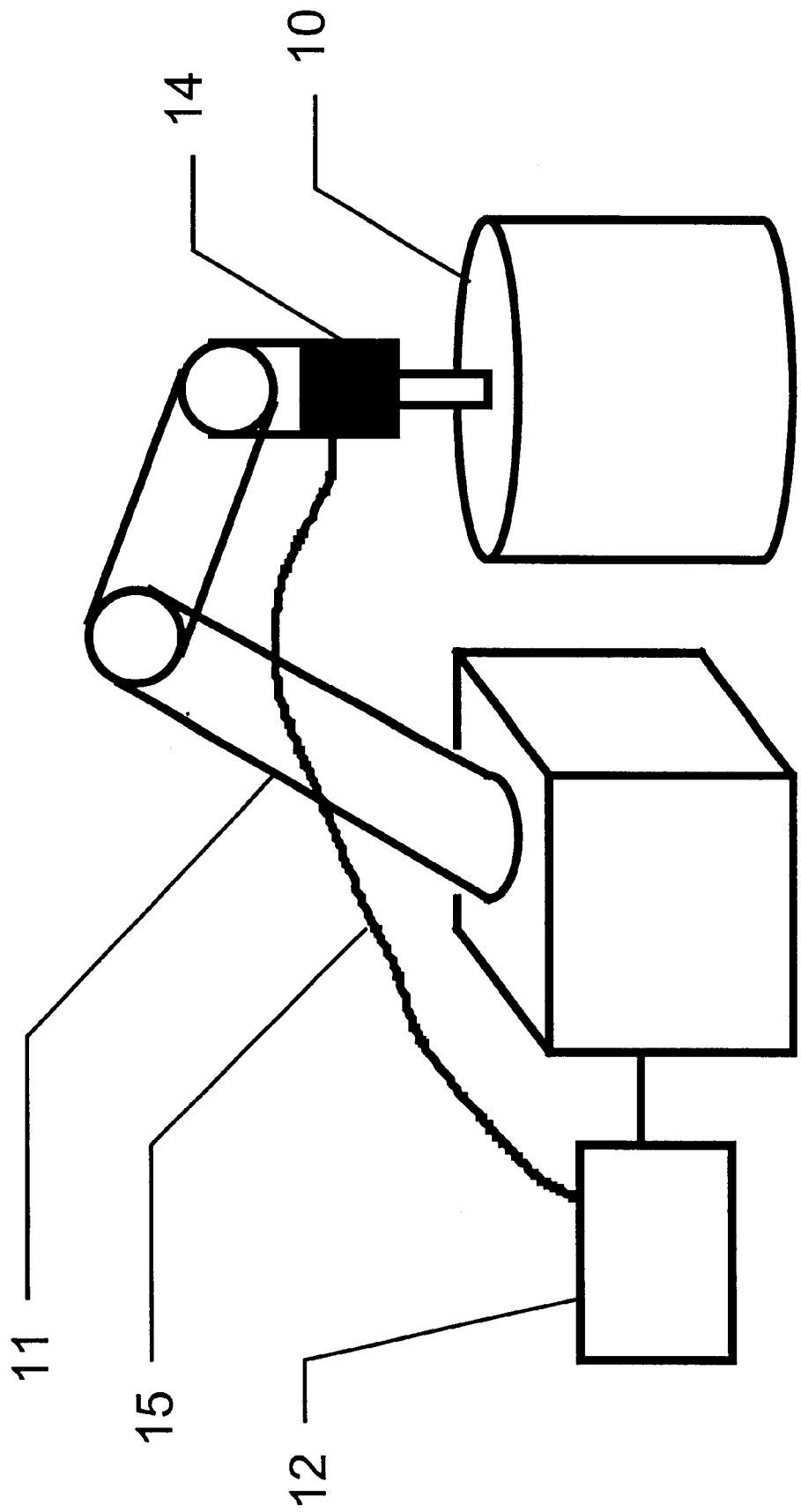
FIG. 1 is an illustration of an application of a multi-axis load cell.

FIG. 1 illustrates an example application of a load cell according to the present invention. A robot 11 operates on a workpiece 10. Controller 12 monitors and controls the operation of robot 11. Load cell 14 provides information via connection 15 to controller 12 concerning forces and moments exerted by or on robot 1 1. For example, load cell 14 can provide measurement of axial moment (or torsion) to allow controller 12 to direct robot 11 to apply a certain torque to a fastener. As another example, load cell 14 can provide measurement of general loading to allow controller to direct robot 11 to apply selected force to workpiece 10 during a finishing operation. As another example, load cell 14 can provide measurement of general loading to allow controller 12 to safely control robot 11 when unexpected high loads are encountered (as would be caused by collisions between robot 11 and objects unexpectedly within the workspace of robot 11).

Figure 2:
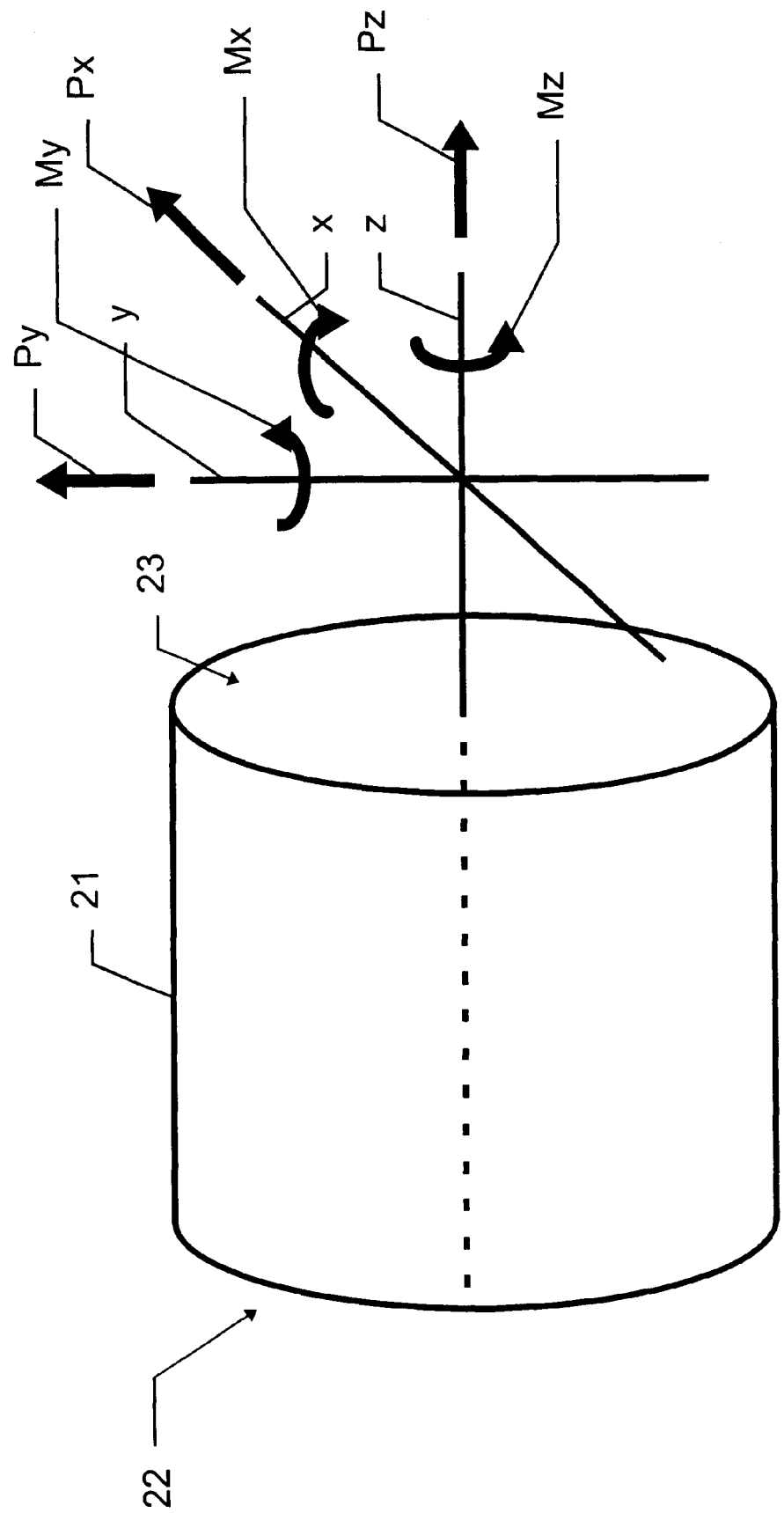
FIG. 2 is an illustration of general loading of a multi-axis load cell.

FIG. 2 illustrates general loading of a load cell. Load cell 21 is loaded at ends 22, 23. A coordinate system comprising three axes x, y, z is conventionally used to describe loading of the cell. A first axis z lies substantially parallel to the longitudinal axis of the cell 21. The other two axes x, y are mutually orthogonal, and are both orthogonal to the first axis z. General loading of cell 21 comprises force load components Px, Py, Pz along each of the three axes x, y, z and moment load components Mx, My, Mz about each of the three axes x, y, z. Moment load component Mz about the first axis z is often referred to as torsion. Force load component Pz along the first axis z is often referred to as axial load.

The present invention comprises strain gauges mounted at specified locations and specified orientations on surfaces of a load cell body, where the load cell body material is characterized by its modulus of elasticity (E) and Poisson's ratio (v). Strain gauges mounted at locations and orientations according to the present invention allow determination of a selected load component without requiring special mechanical structures or a multiplicity of strain gauges.

Relationships among gauge locations and orientations and sensitivity to particular load components useful in understanding the present invention are discussed in Spletzer, U.S. Pat. No. 5,850,044 (Dec. 1998), incorporated herein by reference. Spletzer presents example designs that provide signals indicative of individual load components. The present invention comprises designs that provide coupled, linearly-independent outputs, allowing determination of load components from decoupling of output from a minimal number of gauges.

The output of a strain gauge mounted with a surface of a body under load can be affected by numerous components of the load. Each gauge output can be expressed as a combination of the load components (a load-strain equation). Mounting several gauges with the body yields several gauge outputs, each indicative of a combination of load components. As described below, individual load components can be determined from the several gauge outputs as long as the gauge placement and orientation produces sufficient linearly-independent load-strain equations to determine the load component of interest.

Certain gauge orientations can result in gauge outputs that are insensitive to certain load components: gauges at 0 and 90 degrees are sensitive only to bending and axial load; gauges at $\pm\beta_\tau$ are sensitive to shear and torsion only. Accordingly, at least three gauges must be at angles other than 0 or 90 degrees if shear or torsion are to be determined. Similarly, at least three gauges must be at angles other than $\pm\beta_\tau$ if bending or axial load are to be determined. Further, there must be at least as many linearly-independent load-strain equations as there are load components that influence the gauges' outputs (e.g., gauges with the same load-strain equation as other gauges, or as linear combinations of other equations or gauges, do not provide new information to the determination of load components).

SIX AXIS, CALIBRATED LOAD CELL

Six strain gauges can be mounted with a body at various orientations and azimuths, subject to the previous constraints. The strain gauge outputs can be calibrated, either by computational simulation or by experiment, to produce a sensitivity matrix relating the strain gauge outputs to the applied load components. The inverse of the sensitivity matrix decouples the load-strain equations, allowing unknown components of applied loads to be determined from the strain gauge outputs and the inverse of the sensitivity matrix.

SIX AXIS, USING SPECIFIC GAUGE ORIENTATIONS

Mounting gauges at 0 or 90 degrees and at $\pm\beta_\tau$ can simplify the determination of load components since gauges at those angles are sensitive to only certain load components. The general relationship for a gauge at 0 degrees and at azimuth $\theta$ is given by equation 1.

$$\varepsilon_0 = \left( \frac{M_x r \sin\theta - M_y r \cos\theta}{EI} + \frac{P_z}{EA} \right) \quad (1)$$

The general relationship for a gauge at $\beta_\tau$ and at azimuth $\theta$ is given by equation 2.

$$\varepsilon_{\beta_\tau} = 2\sqrt{v} \left( \frac{(-P_x \sin\theta + P_y \cos\theta) Q_{max}}{EI(D-d)} + \frac{M_z r}{EJ} \right) \quad (2)$$

For three gauges placed at arbitrary azimuths $\theta_1$, $\theta_2$, and $\theta_3$, two sets of three coupled equations results between three of the applied loads and the three strains at either gauge angle. These relations are shown in equations 3 and 4, with the arguments of the strain value representing the gauge angle and the azimuth.

$$\begin{bmatrix} \varepsilon(0, \theta_1) \\ \varepsilon(0, \theta_2) \\ \varepsilon(0, \theta_3) \end{bmatrix} = \begin{bmatrix} \sin\theta_1 & \cos\theta_1 & 1 \\ \sin\theta_2 & \cos\theta_2 & 1 \\ \sin\theta_3 & \cos\theta_3 & 1 \end{bmatrix} \begin{bmatrix} \frac{M_x r}{EI} \\ -\frac{M_y r}{EI} \\ \frac{P_z}{EA} \end{bmatrix} \quad (3)$$

$$\begin{bmatrix} \varepsilon(\beta_\tau, \theta_1) \\ \varepsilon(\beta_\tau, \theta_2) \\ \varepsilon(\beta_\tau, \theta_3) \end{bmatrix} = \begin{bmatrix} \sin\theta_1 & \cos\theta_1 & 1 \\ \sin\theta_2 & \cos\theta_2 & 1 \\ \sin\theta_3 & \cos\theta_3 & 1 \end{bmatrix} \begin{bmatrix} -2\sqrt{v} \frac{P_x Q_{max}}{E(D-d)} \\ 2\sqrt{v} \frac{P_y Q_{max}}{E(D-d)} \\ 2\sqrt{v} \frac{M_z r}{EJ} \end{bmatrix} \quad (4)$$

The closed form expressions for each of the six loads in terms of the measured strained can be determined by the inverted coefficient matrix from equations 3 and 4, as in equation 5.

$$\begin{bmatrix} \sin\theta_1 & \cos\theta_1 & 1 \\ \sin\theta_2 & \cos\theta_2 & 1 \\ \sin\theta_3 & \cos\theta_3 & 1 \end{bmatrix}^{-1} = \quad (5)$$

$$\frac{\begin{bmatrix} \cos\theta_2 - \cos\theta_3 & \cos\theta_3 - \cos\theta_1 & \cos\theta_1 - \cos\theta_2 \\ \sin\theta_3 - \sin\theta_2 & \sin\theta_1 - \sin\theta_3 & \sin\theta_2 - \sin\theta_1 \\ \sin(\theta_2 - \theta_3) & \sin(\theta_3 - \theta_1) & \sin(\theta_1 - \theta_2) \end{bmatrix}}{\sin(\theta_1 - \theta_2) + \sin(\theta_2 - \theta_3) + \sin(\theta_3 - \theta_1)}.$$

The inverse shows that conditions exist where a unique solution for the loads might not be possible. Specifically, the conditions exist where the inverse is singular, as in the condition in equation 6.

$$\sin(\theta_1-\theta_2)+\sin(\theta_2-\theta_3)+\sin(\theta_3-\theta_1)=0 \quad (6)$$

Notice that the selection of a reference axis (azimuth of 0) is arbitrary. Rotating the axis to a new position has no effect on any of the sine terms since they depend only on the difference in angles. Consequently, $\theta_3$ can be set to 0 with no loss of generality. The singularity constraint can be restated as in equation 7.

$$\sin(\theta_1 - \theta_2) + \sin(\theta_2) - \sin(\theta_1) = 0 \quad (7)$$

$$\sin\theta_1 \cos\theta_2 - \sin\theta_2 \cos\theta_1 + \sin\theta_2 - \sin\theta_1 = 0$$

$$\frac{\sin\theta_2}{1 - \cos\theta_2} = \frac{\sin\theta_1}{1 - \cos\theta_1}$$

$$\cot\frac{\theta_2}{2} = \cot\frac{\theta_1}{2}$$

The final relationship is satisfied only when $\theta_1=\theta_2$. Accordingly, the load components can be determined as long as no two gauges have the same gauge angle and the same azimuth.

Solving equations 3 and 4 results in equations 8 and 9. The relationships are completely general for a six axis load cell consisting of three gauges places at zero gauge angle and three gauges placed at fir Any set of three unique azimuth positions can be chosen for each set of three equations.

$$\begin{bmatrix} P_x \\ P_y \\ M_z \end{bmatrix} = \frac{E \begin{bmatrix} -\frac{D-d}{Q_{max}}(\cos\theta_2 - \cos\theta_3) & -\frac{D-d}{Q_{max}}(\cos\theta_3 - \cos\theta_1) & -\frac{D-d}{Q_{max}}(\cos\theta_1 - \cos\theta_2) \\ \frac{D-d}{Q_{max}}(\sin\theta_3 - \sin\theta_2) & \frac{D-d}{Q_{max}}(\sin\theta_1 - \sin\theta_3) & \frac{D-d}{Q_{max}}(\sin\theta_2 - \sin\theta_1) \\ \frac{J}{r}\sin(\theta_2 - \theta_3) & \frac{J}{r}\sin(\theta_3 - \theta_1) & \frac{J}{r}\sin(\theta_1 - \theta_2) \end{bmatrix}}{2\sqrt{v}\,(\sin(\theta_1 - \theta_2) + \sin(\theta_2 - \theta_3) + \sin(\theta_3 - \theta_1))} \begin{bmatrix} \varepsilon(\beta_\tau, \theta_1) \\ \varepsilon(\beta_\tau, \theta_2) \\ \varepsilon(\beta_\tau, \theta_3) \end{bmatrix} \quad (8)$$

$$\begin{bmatrix} M_x \\ M_y \\ P_z \end{bmatrix} = \frac{E \begin{bmatrix} \frac{I}{R}(\cos\theta_2 - \cos\theta_3) & \frac{I}{R}(\cos\theta_3 - \cos\theta_1) & \frac{I}{R}(\cos\theta_1 - \cos\theta_2) \\ -\frac{I}{R}(\sin\theta_3 - \sin\theta_2) & -\frac{I}{R}(\sin\theta_1 - \sin\theta_3) & -\frac{I}{R}(\sin\theta_2 - \sin\theta_1) \\ A\sin(\theta_2 - \theta_3) & A\sin(\theta_3 - \theta_1) & A\sin(\theta_1 - \theta_2) \end{bmatrix}}{(\sin(\theta_1 - \theta_2) + \sin(\theta_2 - \theta_3) + \sin(\theta_3 - \theta_1))} \begin{bmatrix} \varepsilon(0, \theta_1) \\ \varepsilon(0, \theta_2) \\ \varepsilon(0, \theta_3) \end{bmatrix} \quad (9)$$

A load cell design can comprise gauges mounted every 60 degrees about the circumference of a cylinder. If the zero angle gauges are mounted at 0, 120, and 240 degrees and the $\beta_\tau$ angle gauges are mounted at 60, 180, and 300 degrees, then the resulting load components are given by equation 10.

$$P_x = -\frac{E(D-d)}{2\sqrt{3v}\,Q_{max}}[\varepsilon(\beta_\tau, \theta_2) - \varepsilon(\beta_\tau, \theta_3)] \quad (10)$$

$$P_y = -\frac{E(D-d)}{6\sqrt{v}\,Q_{max}}[2\varepsilon(\beta_\tau, \theta_1) - \varepsilon(\beta_\tau, \theta_2) - \varepsilon(\beta_\tau, \theta_3)]$$

$$P_z = \frac{EA}{3}[\varepsilon(0, \theta_1) + \varepsilon(0, \theta_2) + \varepsilon(0, \theta_3)]$$

$$M_x = \frac{EI}{\sqrt{3}\,r}[\varepsilon(0, \theta_2) - \varepsilon(0, \theta_3)]$$

$$M_y = \frac{EI}{3r}[2\varepsilon(0, \theta_1) - \varepsilon(0, \theta_2) - \varepsilon(0, \theta_3)]$$

$$M_z = \frac{J}{6\sqrt{v}\,r}[\varepsilon(\beta_\tau, \theta_1) + \varepsilon(\beta_\tau, \theta_2) + \varepsilon(\beta_\tau, \theta_3)]$$

The surface curvature of a circular cross section load cell can poses problems for small radius load cells. A polygonal shape can be used with the present invention, allowing each strain gauge to mount with a flat surface. The stiffness properties of the polygonal shape are important, specifically the polar moment of inertia. As an example, a square cross section could be used. One axial (0 degrees) and one $\beta_\tau$ gauge can be mounted with each of three faces (azimuths of 0, +90, and −90 degrees). The corresponding relations are given in equation 11.

$$P_x = -\frac{E(D-d)}{4\sqrt{v}\,Q_{max}}[\varepsilon(\beta_\tau, \theta_2) - \varepsilon(\beta_\tau, \theta_3)] \quad (11)$$

$$P_y = -\frac{E(D-d)}{4\sqrt{v}\,Q_{max}}[2\varepsilon(\beta_\tau, \theta_1) - \varepsilon(\beta_\tau, \theta_2) - \varepsilon(\beta_\tau, \theta_3)]$$

$$P_z = \frac{EA}{2}[\varepsilon(0, \theta_2) + \varepsilon(0, \theta_3)]$$

$$M_x = \frac{EI}{2r}[\varepsilon(0, \theta_2) - \varepsilon(0, \theta_3)]$$

$$M_y = \frac{EI}{2r}[2\varepsilon(0, \theta_1) - \varepsilon(0, \theta_2) - \varepsilon(0, \theta_3)]$$

$$M_z = \frac{5J}{32\sqrt{v}\,r}[\varepsilon(\beta_\tau, \theta_2) + \varepsilon(\beta_\tau, \theta_3)]$$

Dummy resistors can be used in combination with the strain gauges to produce bridges to facilitate determination of strain gauge outputs. The combination of strain gauge outputs can be accomplished, for example, with analog electronic circuitry or with well-known microprocessors.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A load cell comprising:
   a) a body having a body axis, first and second ends, made of a material having a Poisson's ratio (v);
   b) first, second, and third strain gauges mounted with the body at azimuths different from each other and at orientations relative to the axis other than, 0 and 90 degrees; and
   c) fourth, fifth, and sixth strain gauges mounted with the body at azimuths different from each other and at orientations other than substantially $$\frac{1}{2}\arccos\left(\frac{v-1}{v+1}\right)$$

and substantially $$-\frac{1}{2}\arccos\left(\frac{v-1}{v+1}\right).$$

2. A load cell according to claim 1, wherein the first, second, and third strain gauges are mounted at orientations of substantially $$\frac{1}{2}\arccos\left(\frac{v-1}{v+1}\right)$$

or substantially $$-\frac{1}{2}\arccos\left(\frac{v-1}{v+1}\right).$$

3. A load cell according to claim 1, wherein the fourth, fifth, and sixth strain gauges are mounted at orientations of substantially 0 degrees or substantially 90 degrees.

4. A load cell according to claim 1, wherein the body has a substantially circular cross section, and wherein the plurality of strain gauges are mounted at substantially even azimuthal intervals about a circumference of the circle.

5. A load cell according to claim 1, wherein the body has a substantially rectangular cross section, and wherein the first, second, and third strain gauges are mounted with the body at locations corresponding to different faces of the rectangular cross section.

6. A load cell according to claim 1, wherein the body has a substantially polygonal cross section, and wherein the first, second, and third strain gauges are mounted with the body at locations corresponding to different faces of the polygonal cross section.

7. A load cell according to claim 6, wherein the body has a substantially rectangular cross section, and wherein the fourth, fifth, and sixth strain gauges are mounted with the body at locations corresponding to different faces of the rectangular cross section.

8. A load cell comprising:
    a) a body having a body axis, first and second ends, adapted to receive a load applied made of a material having a Poisson's ratio (v); and
    b) first, second, and third strain gauges mounted with the body at azimuths different from each other and at orientations relative to the axis of substantially $$\frac{1}{2}\arccos\left(\frac{v-1}{v+1}\right)$$

or substantially $$-\frac{1}{2}\arccos\left(\frac{v-1}{v+1}\right).$$

9. A load cell according to claim 8, wherein the body has a substantially circular cross section, and wherein the first, second, and third strain gauges are mounted at substantially even azimuthal intervals about a circumference of the circle.

10. A load cell according to claim 8, wherein the body has a substantially rectangular cross section, and wherein the first, second, and third strain gauges are mounted with the body at locations corresponding to different faces of the rectangular cross section.

11. A load cell according to claim 8, wherein the body has a substantially polygonal cross section, and wherein the first, second, and third strain gauges are mounted with the body at locations corresponding to different faces of the polygonal cross section.

12. A load cell comprising:
    a) a body having a body axis, first and second ends, made of a material having a Poisson's ratio (v); and
    b) first, second, and third strain gauges mounted with the body at azimuths different from each other and at orientations relative to the axis of substantially 0 degrees or substantially 90 degrees.

13. A load cell according to claim 12, wherein the body has a substantially circular cross section, and wherein the first, second, and third strain gauges are mounted at substantially even azimuthal intervals about a circumference of the circle.

14. A load cell according to claim 12, wherein the body has a substantially rectangular cross section, and wherein the first, second, and third strain gauges are mounted with the body at locations corresponding to different faces of the rectangular cross section.

15. A load cell according to claim 12, wherein the body has a substantially polygonal cross section, and wherein the first, second, and third strain gauges are mounted with the body at locations corresponding to different faces of polygonal cross section.

* * * * *